(12) United States Patent  
Lim

(10) Patent No.: US 9,263,799 B2
(45) Date of Patent: Feb. 16, 2016

(54) ANTENNA DEVICE AND ELECTRONIC DEVICE WITH THE SAME

(71) Applicant: Samsung Electronics Co., Ltd., Gyeonggi-do (KR)

(72) Inventor: Young-Kon Lim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 37 days.

(21) Appl. No.: 14/301,699

(22) Filed: Jun. 11, 2014

(65) Prior Publication Data

US 2015/0035709 A1 Feb. 5, 2015

(30) Foreign Application Priority Data

Jul. 31, 2013 (KR) .................. 10-2013-0090672

(51) Int. Cl.
*H01Q 1/24* (2006.01)
*H01Q 1/36* (2006.01)
*H01Q 7/00* (2006.01)
*H02J 7/02* (2006.01)
*H01Q 1/22* (2006.01)
*H01Q 1/44* (2006.01)

(52) U.S. Cl.
CPC ............... *H01Q 7/00* (2013.01); *H01Q 1/2208* (2013.01); *H01Q 1/243* (2013.01); *H01Q 1/44* (2013.01); *H02J 7/025* (2013.01)

(58) Field of Classification Search
USPC .................................. 343/702, 720, 866, 895
See application file for complete search history.

(56) References Cited

U.S. PATENT DOCUMENTS

| 7,298,331 | B2 * | 11/2007 | Oberly | ...................... H01Q 1/38 343/700 MS |
| 7,990,337 | B2 * | 8/2011 | Kato | ................. G06K 19/07749 343/700 MS |
| 2003/0184495 | A1 * | 10/2003 | Tomon | .............. G06K 19/07749 343/895 |
| 2009/0231203 | A1 * | 9/2009 | Ficker | .............. G06K 19/07749 343/700 MS |

FOREIGN PATENT DOCUMENTS

| KR | 10-2012-0103300 A | 9/2012 |
| KR | 10-1205419 B1 | 11/2012 |
| KR | 10-1244193 B1 | 3/2013 |

* cited by examiner

*Primary Examiner* — Tan Ho
(74) *Attorney, Agent, or Firm* — Cha & Reiter, LLC.

(57) ABSTRACT

An electronic device includes a sheet shaped antenna which is particularly useful for near field communication. The antenna includes a loop type antenna radiator formed on a carrier, the radiator having spiraling loops along an outer region of the carrier. A first feed terminal is provided at one end of the antenna radiator and disposed inside the loops. A second feed terminal is provided at an opposite end of the antenna radiator and disposed outside the loops. The carrier has a cut-out in proximity to the first feed terminal, which enables the first feed terminal to be bent in the same direction as the second feed terminal without bending an outer segment of the antenna radiator adjacent to the cut-out. In this manner, the feed terminals may be defined on a single layer, allowing for a simplified assembly process.

20 Claims, 4 Drawing Sheets

ANTENNA DEVICE AND ELECTRONIC DEVICE WITH THE SAME

CLAIM OF PRIORITY

This application claims priority under 35 U.S.C. §119 to an application filed in the Korean Intellectual Property Office on Jul. 31, 2013 and assigned Serial No. 10-2013-0090672, the contents of which are incorporated herein by reference.

BACKGROUND

1. Technical Field

The present disclosure relates generally to antennas and electronic devices that include an antenna.

2. Description of the Related Art

Recently, electronic devices for communication have been developed to include various functions according to users' demands. Today's electronic devices such as smart phones perform a basic call function and have many other capabilities, examples of which include a web browser, music player, high definition video player, and a camera.

For the communication function, one or more antennas are provided to enable operation in different frequency bands. For example, it is possible to communicate over diverse frequency bands, such as those of CDMA, PCS, DCS and GSM protocols, in common using one antenna radiator. A communication function of Wi-Fi, GPS, Bluetooth or protocols may also be achieved using one antenna radiator.

Recent electronic devices are equipped with a near field communication (NFC) module and an NFC antenna device for operation in a low frequency band (typically 13.56 MHz). For this frequency band, a radiator having a surface area of at least 30 mm×50 mm is typically required. Meanwhile, with the trend towards slimmer electronic devices, it is desired to minimize the need for additional space within the electronic device for the NFC antenna. To this end, the NFC antenna may be installed in a battery pack of the electronic device, or a battery cover which is detachably coupled to the electronic device. Moreover, in installing or arranging the NFC antenna, it is desirable to reduce cost and time required for its assembly within the electronic device.

SUMMARY

An aspect of the present disclosure is to provide an antenna device having a configuration which enables a reduction in manufacturing cost and time, and an electronic device with the same.

Yet another aspect is to provide an antenna device which has a simple assembly process, and an electronic device with the same.

According to an embodiment, the electronic device includes a sheet shaped antenna. The antenna includes a loop type antenna radiator formed on a carrier, where the radiator has spiraling loops along an outer region of the carrier. A first feed terminal is provided at one end of the antenna radiator and disposed inside the loops. A second feed terminal is provided at an opposite end of the antenna radiator and disposed outside the loops. The carrier has a cut-out in proximity to the first feed terminal, which enables the first feed terminal to be bent in the same direction as the second feed terminal without bending an outer segment of the antenna radiator adjacent to the cut-out. In various embodiments, the antenna may be attached to or integrate with a battery pack of the electronic device.

BRIEF DESCRIPTION OF THE DRAWINGS

The above and other aspects, features and advantages of certain embodiments of the present disclosure will become more apparent from the following detailed description when taken in conjunction with the accompanying drawings in which.

DETAILED DESCRIPTION

Figure 1:
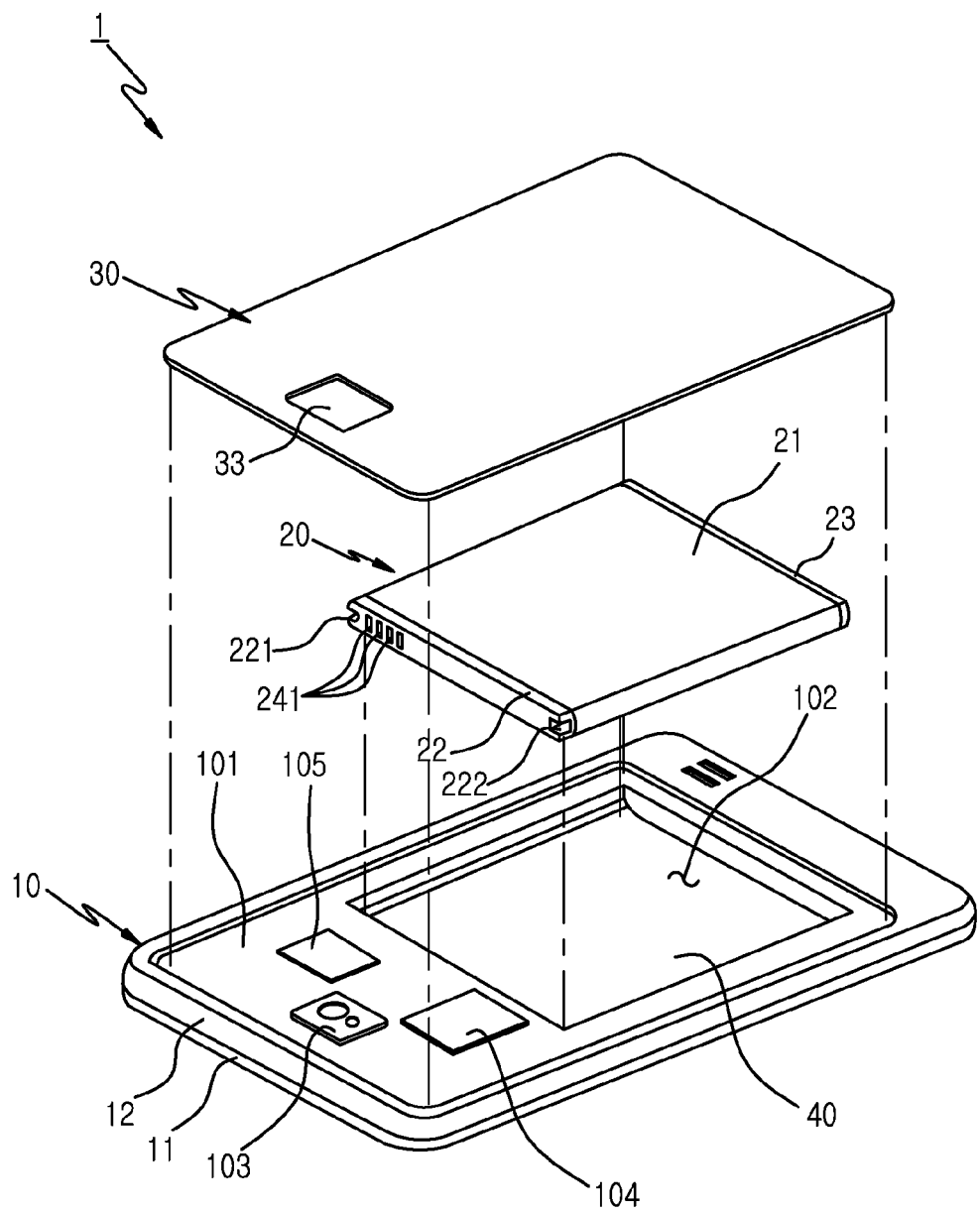
FIG. 1 is an exploded perspective view of an electronic device in which a battery pack and an antenna device are installed according to various embodiments of the present disclosure.

Various embodiments of the present disclosure will be described herein below with reference to the accompanying drawings. In the following description, detailed descriptions of well-known functions or constructions will be omitted to avoid obscuring the disclosure in unnecessary detail. Also, the terms used herein are defined according to the functions of the present disclosure. Thus, the terms may vary depending on user's or operator's intentions or practices. Therefore, the terms used herein should be understood based on the descriptions made herein.

According to various embodiments, the present disclosure describes an electronic device with a sheet shaped antenna, such as a flexible printed circuit board with an integrated radiator. The antenna includes a loop type antenna radiator formed on a carrier, where the radiator has spiraling loops along an outer region of the carrier. A first feed terminal is provided at one end of the antenna radiator and disposed inside the loops. A second feed terminal is provided at an opposite end of the antenna radiator and disposed outside the loops. The carrier has a cut-out in proximity to the first feed terminal, which enables the first feed terminal to be bent in the same direction as the second feed terminal without bending an outer segment of the antenna radiator adjacent to the cut-out.

According to various embodiments, the antenna may be disposed attached to or integrated with at least one component provided in the electronic device. The component may be a battery pack which is built in or detachably installed in the electronic device. According to one embodiment, the antenna device may be attached to a major surface of a battery cell of the battery pack. In an embodiment, the first feed terminal and the second feed terminal may be electrically connected to terminals exposed in the same direction as electrical power connection terminals of the battery pack. According to one embodiment, the first feed terminal and the second terminal may be soldered to the exposed terminals of the battery pack.

According to various embodiments, the battery pack includes a battery cell, a supporter having an opening which exposes a plurality of terminals fixed to an upper portion of the battery cell, and a protection board which is disposed between the battery cell and the supporter so that a terminal connecting with a power source of the battery cell is exposed through the opening. The antenna device is attachable to largest major surface of the battery cell, and the first and second feed terminals may be respectively soldered to antenna feed terminals located at a lower portion of the protection board. In other embodiments, the component may be a battery cover, a case fame, or a "shield can" of the electronic device. The "shield can" shields a noise or an electromagnetic wave generated in electronic elements disposed on a substrate of the electronic device. According to one embodiment, the antenna may be attached and fixed to an inner surface of at least one of a front case frame and a rear case frame of the electronic device, and may be electrically connected with a feeding part disposed on a substrate (main board) when assembling the case frame.

According to various embodiments, the antenna device may be used for near field communication. According to one embodiment, the antenna device may be used in at least one of RFID communication, NFC communication and wireless charging communication. According to one embodiment, the electronic device may be a mobile communication terminal.

Embodiments of an antenna device of the present disclosure may be applied to various types of electronic devices having a communication function. Hereafter, the terms "antenna" and "antenna device" will be used interchangeably. In explaining various embodiments of the present disclosure, a tablet type electronic device including a touch screen unit as a display part is illustrated and described, but the electronic device is not limited thereto. For example, the electronic device may be any one of various electronic devices, such as a personal digital assistant (PDA), a lap-top computer, a mobile phone, a smart phone, a netbook, a mobile internet device (MID), an ultra mobile PC, a tablet personal PC, a navigation device, or the like.

In explaining various embodiments of the present disclosure, an electronic device including a detachable battery pack and an arrangement in which the antenna device is applied to a surface of the battery pack are illustrated (e.g., the antenna device abuts the battery pack surface and/or is integrated with the battery pack), but present disclosure is not limited thereto. For example, the antenna device may be applied to a battery cover or one or more components used as internal construction elements of the electronic device. According to one embodiment, the antenna device is applied to the battery pack which is detachably installed in the electronic device. In other embodiments, the antenna may be attached to or integrated with a built-in battery pack.

FIG. 1 is an exploded perspective view of an electronic device, 1, which includes a battery pack and an antenna device installed adjacently according to various embodiments of the present disclosure. Electronic device 1 includes a main body 10, a battery pack 20 which is detachably installed in a rear surface recess of the main body 10, and a cover 30 which is installed at the rear surface of the main body 10 to protect the battery pack 20 and various other components. Although not shown in FIG. 1, an NFC antenna to be described hereafter is preferably disposed on the surface of the battery pack, between the battery pack 20 and the cover 30. The cover 30 may have an opening 33 which allows a component (e.g., a camera module) installed in the main body 10 to pass there through to be exposed to the exterior.

The main body 10 of the electronic device 1, which may be formed by coupling an upper case frame 11 and a lower case frame 12, receives various electronic function groups therein. Although not shown, a large-screen display module for outputting data may be further installed at a front surface of the electronic device 1. The display module may further include a touch sensor for receiving data input. Thereby, a touch screen unit including the display module and the touch sensor may be installed at the front surface of the electronic device 1.

The electronic device 1 has a "cover installing portion" (interchangeably, "first recess") 101 defined in the rear surface thereof, for receiving the cover 30 and upon which various components may be mounted. For example, these components are detachably installed in respective channels of the recess 101. The battery pack 20, a SIM card installing portion 104 receiving a SIM card, a memory card installing portion 105 or the like may be disposed in the cover installing portion 101 in sub-recesses thereof. Also, a camera module 103 may be installed on the recess 101 and exposed through the cover opening 22 to the outside thereof.

The depth of the first recess 101, as measured from the bottom surface of the lower case frame 12, may correspond to a thickness of the cover 30. With this design, when the cover 30 is attached to the device 1, its outer surface can be at substantially the same plane as the lower case frame 12. Further, although not shown, a plurality of locking protrusions may be provided in regular intervals along an edge of the cover 30, and a plurality of locking grooves may be provided in the cover installing portion 101, whereby the cover 30 may be fixed to the cover installing portion 101 in a fitting manner between the locking protrusions and the locking grooves.

Meanwhile, a battery pack installing portion 102 ("second recess") is provided in the cover installing portion 101 (i.e., the second recess 102 is a sub-recess of the first recess 101), and receives the battery pack 20 therein. A lower surface of the battery pack installing portion 102 may be composed of a thin plate 40, which isolates the battery pack from other components like the display module disposed in an opposite direction. Side surfaces of the battery pack installing portion 102 may be formed by injection molded structures of the upper case frame 11 and the lower case frame 12.

The battery pack 20 includes a battery cell 21, and first and second supporters 22 and 23 which are provided to support the battery cell 21 at opposite ends of the battery cell 21. The first and second supporters 22 and 23 are generally made of an insulating material like synthetic resin so as to support the battery cell 21.

The first supporter 22 may include a plurality of terminals 241 which are electrically connected to the battery cell 21 in the battery pack 20 and exposed to the exterior so as to be electrically connected with a connector (not shown) installed in the battery pack installing portion 102. According to one embodiment, grooves 221 and 222 are defined in opposite ends of the first supporter 22 and coupled to protrusions provided in the battery pack installing portion 102, thereby guiding installation of the battery pack 20 and also preventing the battery pack 20 from being separated. Other engagement configurations are alternatively possible. The protrusions may be provided at the both ends of the first supporter of the battery pack, and the grooves may be defined in corresponding positions of the battery pack installing portion 102.

According to various embodiments of the present disclosure, a near field communication (NFC) module (not shown) is provided in the electronic device 1, and an antenna device 25 (FIG. 2) for NFC is disposed integrated with or abutting the battery pack 20. The antenna device 25 may be formed by a sheet type flexible printed circuit board (FPCB), and a conductive pattern may be disposed in a loop shape and may serve as an antenna radiator.

According to one embodiment, the antenna radiator 25 may be disposed on a major surface of the battery pack 20 when assembling the battery pack 20, and two feed terminals may feed electrical power to the electronic device 1 using two of the terminals 241 of the battery pack. Two other terminals 241 may be used to receive radio frequency (RF) power from the NFC module and connect to the two terminals of the antenna 25 for transmitting the RF power (and vice versa for receiving NFC signals). According to one embodiment, since a conventional sheet type antenna device has a loop type antenna radiator with multiple spiraling loops, one feed terminal may be disposed inside the spiraling loops, and the other feed terminal may be disposed outside the loops. The one feed terminal disposed inside the loops should be disposed on the same plane as that of the feed terminal to which it connects. In conventional designs, this connection is made through a via of a flexible printed circuit, which is inconvenient and adds to manufacturing cost and assembly time.

According to one embodiment, to overcome the above-noted limitations of the conventional antenna, in the present disclosure, a portion around the one feed terminal disposed inside the loops may be cut away. This allows the one feed terminal to be bent in the same direction as the other feed terminal disposed outside the loops, and thus both may be soldered in the same direction. According to one embodiment, due to such configuration, the flexible printed circuit need not be provided in at least two layers (as in conventional designs) in order to dispose the two feed terminals in the same direction.

Hereinafter, detailed description of the battery pack 20 and the antenna device 25 applied to the battery pack 20 will be provided.

Figure 2:
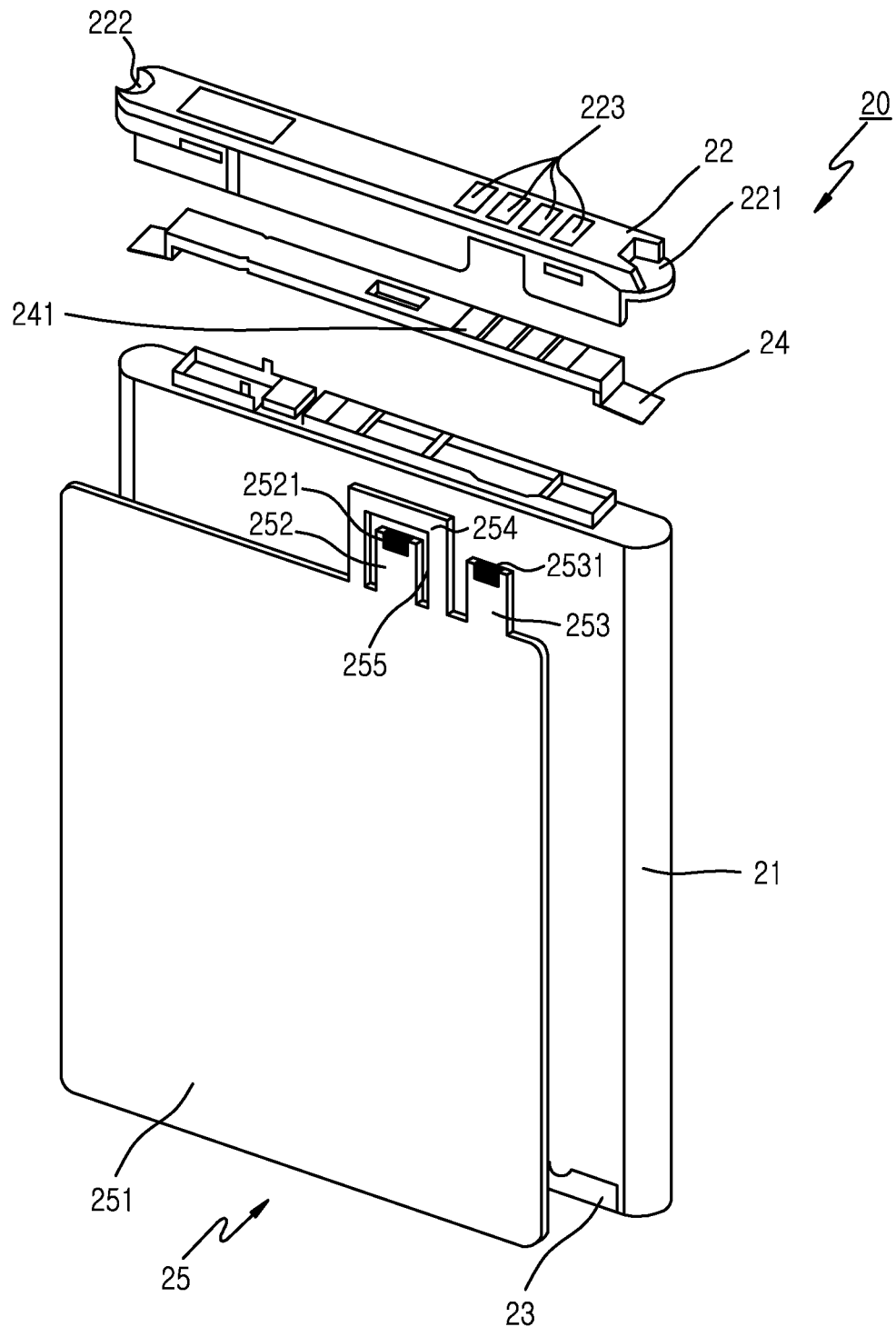
FIG. 2 is an exploded perspective view of a battery pack/antenna device assembly, which may be employed in the electronic device of FIG. 1.

FIG. 2 is an exploded perspective view of a battery pack/antenna device assembly, which may be employed in the electronic device 1 of FIG. 1. As shown in FIG. 2, the battery pack 20 may include the battery cell 21, and the first and second supporters 22 and 23 which are made of an insulating material and fixed to upper and lower ends of the battery cell 21, respectively. A protection board 24 may be disposed between the first supporter 22 and the battery cell 21. A plurality of terminals 241 may be installed at the protection board 24, where at least one pair of the terminals is electrically connected to the battery cell 21 and another pair is connected to the antenna device 25 as mentioned earlier.

According to one embodiment, the first supporter 22 has a plurality of openings 223. The openings 223 may be disposed at positions corresponding to the plurality of terminals 241 of the protection board 24. Therefore, when the protection board 24 is fixed to the battery cell 21 by soldering or the like, and the first supporter 22 is finally installed thereon, the terminals 241 of the protection board 24 may be exposed through the openings 223 of the first supporter 22. According to one embodiment, the first supporter 22 and the second supporter 23 is fixed to the battery cell 21 by a suitable fixing means or in a fitting manner (e.g. press fit).

According to one embodiment, the antenna device 25 may have a sheet shape with a dielectric carrier defining the sheet shape and radiating elements embedded in or attached to the carrier, and may be attached to the battery cell 21. The antenna device 25 may have two terminal portions 252 and 253 protruding to an upper side thereof, with a first feed terminal 2521 and a second feed terminal 2531 exposed at each terminal portion. The antenna device 25 may be a flexible printed circuit. Here, a loop type antenna radiator 256 (shown in FIG. 3, radiators are not shown in FIG. 2) may be wound multiple times in a spiraling pattern along an outer region (perimeter) of the antenna device 25. Inner and outer ends of the antenna radiator 256 may be electrically connected to the first (inner) feed terminal 2521 and the second (outer) feed terminal 2531, respectively. (Inner feed terminal 2521 can also be considered an inside end of the spiraling pattern of antenna radiator 256; outer feed terminal can be considered an outer end of the spiraling pattern.) According to one embodiment, the first terminal portion 252 and the second terminal portion 253 may be bent and then electrically connected to corresponding terminals 241 at a lower portion of the protection board 24 by soldering. (Antenna 25 with the terminal portions 252, 253 bent for final assembly is shown in FIG. 4, described later.) The inner feed terminal 2521 is thereby connected, via the feed terminal 241 soldered thereto, to one terminal of a transmission line of the above-noted NFC module. The outer feed terminal 2531 is similarly connected to the other terminal of the transmission line. To facilitate the soldering, the two terminal portions 252 and 253 may be bent in the same direction, and thus the two feed terminals 2521 and 2531 may be exposed in the same direction. However, due to a structure of the antenna device 25 having the loop type antenna radiator 256, one feed terminal 2521 should be disposed inside the spiraling loops and the other feed terminal 2531 should be disposed outside the loops.

According to one embodiment, to facilitate the soldering connection, a cut-away portion ("cut-out") 255 may be provided around an edge of the inner feed terminal 2521. Therefore, the first terminal portion 252 including the first feed terminal 2521 may be separated from an edge portion 254 by the cut-away portion 255. This configuration advantageously embodies the two feed terminals 2521 and 2531 on a single layer of the flexible printed circuit, and thus inconvenience of defining the feed terminal on another layer through a via of the flexible printed circuit may be prevented.

Figure 3:
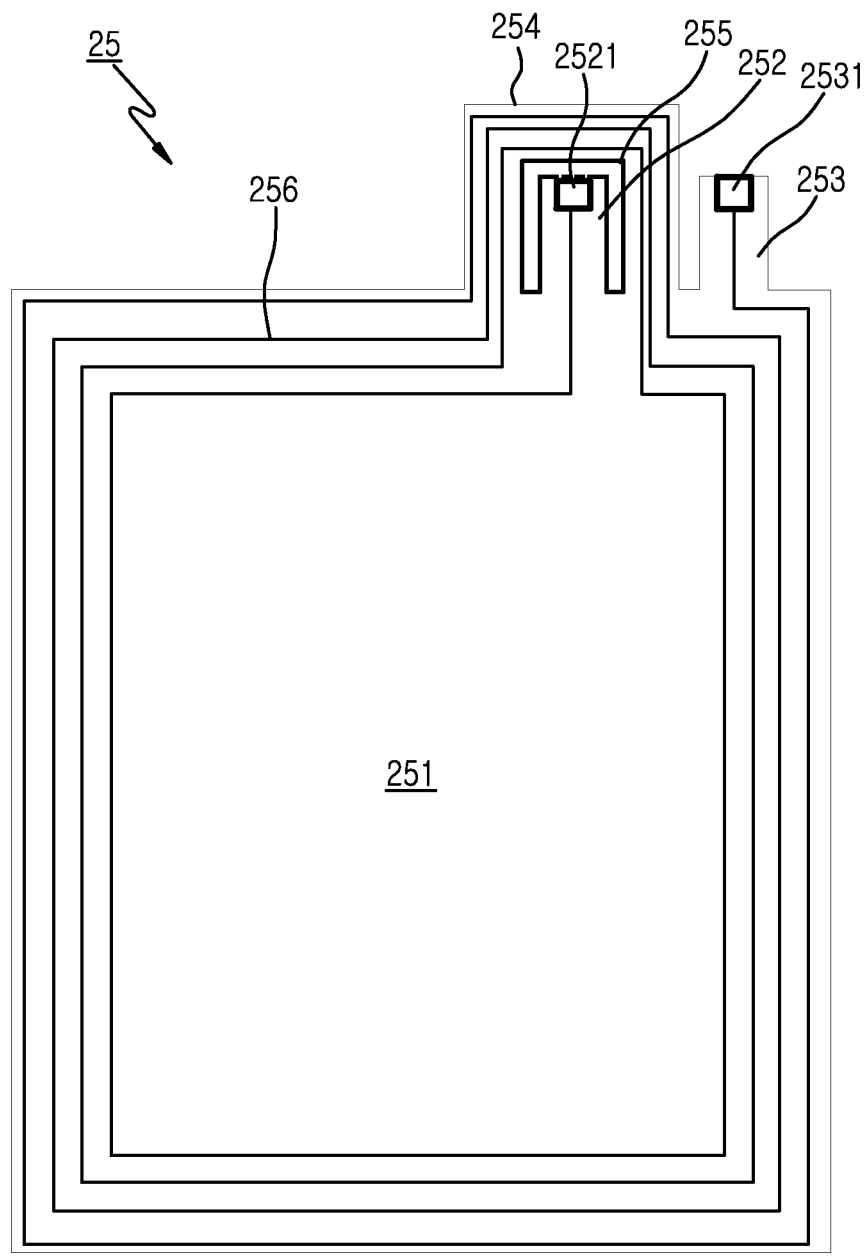
FIG. 3 is a plan view illustrating an embodiment of an antenna device according to an embodiment.
Figure 4:
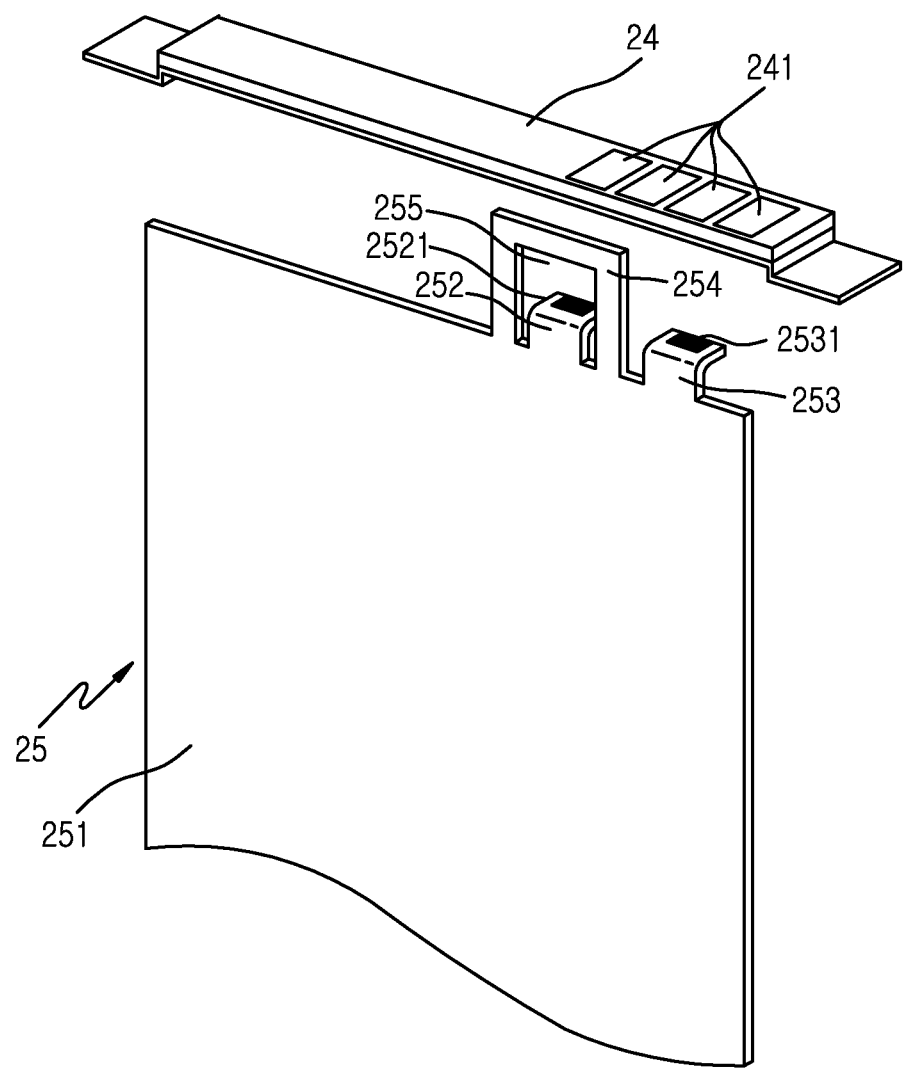
FIG. 4 is a perspective view illustrating a state in which an antenna device is installed within the electronic device of FIG. 1.

FIG. 3 is a plan view illustrating the antenna device 25 according to one embodiment. Antenna 25 may have a configuration in which a pattern type antenna radiator 256 is wound multiple times in a spiraling manner along a perimeter of the flexible printed circuit. Thereby, the antenna radiator 256 is composed of multiple spiraling loops, the radiator 256 thus being a continuous conductor from an inner end to an outer end of the spiraling loops. The inner and outer ends of the antenna radiator 256 may be electrically connected to the two feed terminals 2521 and 2531, respectively. As noted above, due to the spiraling loop structure of the antenna radiator 256, the first feed terminal 2521 is disposed inside the loop and the second feed terminal 2531 may be disposed outside the loop. Therefore, a cut-away portion 255 defined along an edge of the first feed terminal 2521 may be provided in the first terminal portion 252 in which the first feed terminal 2521 is disposed and which protrudes from a body portion 251. The cut-away portion 255 is formed between the inner feed terminal 2521 and a portion of the radiator containing a segment of the conductive lines of the multiple loops. Due to the cut-away portion 255, the first terminal portion 252 may be bent toward a front or rear surface regardless of the edge portion 254.

According to one embodiment, the antenna radiator 256 may be wound multiple times along the perimeter of the body portion 251 (where the perimeter includes the protruding edge portion 254) from the first feed terminal 2521. The outer point of the spiraling loops may be electrically connected to the second feed terminal 2531 of the second terminal portion 253 protruding from the body portion (carrier or substrate) 251 and disposed outside of the loops.

According to the example illustrated, the cut-away portion 255 is cut away in a U shape along the edge of the first feed terminal 2521. In other embodiments, the cut-away portion 255 may be shaped differently, such as a circle and an oval, according to a shape of the battery pack 20 or a soldering structure with the terminals of the protection board.

In FIG. 3, four spiraling loops are shown. However, other embodiments may employ more or fewer loops.

FIG. 4 is a perspective view illustrating a state in which an antenna device is installed within the electronic device 1 of FIG. 1. Here, the feed terminals 2521 and 2531 of the antenna device 25 may be soldered to a lower portion of a position in which the terminals 241 of the protection board 24 are disposed. In this case, the first terminal portion 252 and the second terminal portion 253 protruding upward from the body portion 251 of the antenna device 25 may be bent at a predetermined angle and then may be fixed to the lower portion of the protection board 24. According to one embodiment, the first terminal portion 252 disposed inside the loop of the antenna radiator 256 may be bent in the same direction as the second terminal portion 253 by virtue of the cut-away portion 255, and the first feed terminal 2521 of the first terminal portion 252 may be also exposed in the same direction as the second feed terminal 2531. When the first terminal portion 252 is thereby bent, the edge portion containing the segment of conductive lines of the antenna radiator loops resembles a U-shaped handle.

According to one embodiment, the first feed terminal 2521 and the second feed terminal 2531 are soldered to a pair of the terminals 241 at the lower portion of the protection board 24. Then, the edge portion 254 defined by the cut-away portion 255 provided along the edge of the first terminal portion 252 may be attached to an outer surface of the first supporter 22 of the battery cell 21, or may be fixed to a place of the battery cell 21 by a separate mechanical structure.

According to one embodiment, although not shown, the antenna device 25 is attached to the outer surface of the battery cell 21; the protection board 24, the first supporter 22 and the second supporter 23 are assembled; and then a finishing process may be performed by using a separate packing tape. According to one embodiment, in order to orient a radiation direction of the antenna radiator 256 in a single direction, a ferrite film or a film made of a polymer material may be further interposed between the battery cell 21 and the antenna device 25. These films may be attached and fixed to the battery cell.

According to one embodiment, the antenna device may be used in RFID communication, NFC communication, wireless charging communication, or the like.

According to the above-mentioned various embodiments, since the antenna feed terminals which electrically connect the antenna to the NFC module may be defined on a common, single layer of the antenna substrate, even though the antenna has a loop shape of multiple spiraling loops, it is possible to provide a simple assembly process and also reduce manufacturing cost and time.

While the invention has been shown and described with reference to certain embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims and equivalents thereof.

What is claimed is:

1. An electronic device comprising:
  an antenna which comprises:
  a sheet shaped carrier;
  an antenna radiator formed on the carrier, the antenna radiator having spiraling loops along an outer region of the carrier;
  a first feed terminal provided at one end of the antenna radiator and disposed inside the loops; and
  a second feed terminal provided at an opposite end of the antenna radiator and disposed outside the loops,
  wherein the carrier includes a cut-out in proximity to the first feed terminal to enable the first feed terminal to be bent without bending an outer segment of the antenna radiator adjacent to the cut-out.

2. The electronic device of claim 1, wherein the antenna is formed as a flexible printed circuit.

3. The electronic device of claim 1, wherein the antenna is disposed in an internal space of the electronic device.

4. The electronic device of claim 1, wherein the antenna is assembled to at least one component provided in the electronic device.

5. The electronic device of claim 4, wherein the component is a battery pack which is built in or detachably installed in the electronic device.

6. The electronic device of claim 5, wherein the antenna is attached to a major surface of a battery cell of the battery pack.

7. The electronic device of claim 5, wherein the first feed terminal and the second feed terminal are electrically connected to terminals exposed in the same direction as electrical power connection terminals of the battery pack.

8. The electronic device of claim 7, wherein the first feed terminal and the second feed terminal are soldered to the exposed terminals.

9. The electronic device of claim 5, wherein the battery pack comprises,
  a battery cell;
  a supporter having an opening which exposes a plurality of terminals fixed to an upper portion of the battery cell; and
  a protection board which is disposed between the battery cell and the supporter so that a terminal connected to a power source of the battery cell is exposed through the opening,
  wherein the antenna is attached to a major surface of the battery cell, and the first and second feed terminals are respectively soldered to antenna feed terminals located at a lower portion of the protection board.

10. The electronic device of claim 4, wherein the component is a case frame of the electronic device.

11. The electronic device of claim 4, wherein the component is a battery cover of the electronic device.

12. The electronic device of claim 1, wherein the cut-out is in the form of a U-shape, and the outer segment of the antenna radiator adjacent to the cut-out comprises a U-shaped segment of each of the spiraling loops.

13. The electronic device of claim 1, wherein the antenna is used for near field communication (NFC).

14. The electronic device of claim 13, wherein the antenna is used in at least one of RFID communication, NFC communication and wireless charging communication.

15. The electronic device of claim 1, wherein the electronic device is a mobile communication terminal.

16. An electronic device comprising:
  a battery pack disposed in an electronic device to provide electrical power; and
  an antenna adjacent to or integrated with the battery pack, wherein the antenna comprises:
  a sheet shaped carrier;
  an antenna radiator formed on the carrier, the antenna radiator having spiraling loops along an outer region of the carrier;
  a first feed terminal provided at one end of the antenna radiator and disposed inside the loops; and
  a second feed terminal provided at an opposite end of the antenna radiator and disposed outside the loops, wherein the carrier includes a cut-out in proximity to the first feed terminal to enable the first feed terminal to be bent without bending an outer segment of the antenna radiator adjacent to the cut-out.

17. The device of claim 16, wherein the battery pack comprises,
a battery cell;
a supporter having an opening which exposes a plurality of terminals fixed to an upper portion of the battery cell; and
a protection board which is disposed between the battery cell and the supporter so that a terminal connected to a power source of the battery cell is exposed through the opening,
wherein the antenna is attached to a major surface of the battery cell, and the first and second feed terminals are respectively soldered to antenna feed terminals located at a lower portion of the protection board.

18. The device of claim 17, wherein the first and second feed terminals are bent in the same direction, exposed in a common direction and respectively soldered to terminals of the protection board.

19. The device of claim 18, wherein the outer segment of the antenna radiator adjacent to the cut-out is in the shape of a loop, and is attached to at least one of the protection board and the supporter.

20. The device of claim 18, wherein the outer segment of the antenna radiator adjacent to the cut-out is in the shape of a loop, and is fixed by a separate mechanism.

\* \* \* \* \*